US 6,696,771 B2

(12) United States Patent
Acharya et al.

(10) Patent No.: US 6,696,771 B2
(45) Date of Patent: Feb. 24, 2004

(54) POWER SWITCH FOR EXTERNAL MODULE ADAPTED TO INTERFACE WITH A PORTABLE INFORMATION HANDLING SYSTEM

(75) Inventors: Shrikant Acharya, Fremont, CA (US); John Crosbie, Fremont, CA (US); Cheyyur J. Anand, Fremont, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 375 days.

(21) Appl. No.: 09/867,329

(22) Filed: May 29, 2001

(65) Prior Publication Data

US 2002/0180277 A1 Dec. 5, 2002

(51) Int. Cl.$^7$ ................................................ H01H 3/00
(52) U.S. Cl. ........................ 307/140; 307/149; 703/300
(58) Field of Search .............................. 307/149, 139, 307/131, 126, 140; 710/303, 304; 702/60; 703/300; 340/540, 644, 635, 649, 652, 653, 656; 367/737, 740

(56) References Cited

U.S. PATENT DOCUMENTS

| 4,667,289 A | * | 5/1987 | Yoshida et al. ............... 713/340 |
| 5,463,261 A | * | 10/1995 | Skarda et al. ................. 307/131 |
| 5,589,719 A | * | 12/1996 | Fiset ............................ 307/131 |
| 5,831,351 A | * | 11/1998 | Khosrowpour et al. ...... 307/139 |
| 6,192,435 B1 | * | 2/2001 | Takahashi .................... 710/302 |

* cited by examiner

Primary Examiner—Gregory J. Toatley, Jr.
(74) Attorney, Agent, or Firm—Brinks Hofer Gilson & Lione

(57) ABSTRACT

The application of external power to an external module connected to a portable information handling system enables the card detection signal to be asserted low, thereby allowing the personal digital assistant to detect and activate the external module. When external power is disconnected from the external module, the card detect signals turn off, thereby deactivating the external module and electrically disconnecting the external module from the personal digital assistant. Substantially all of the power for the external module is provided independently from the internal power supply of the portable information handling system.

23 Claims, 3 Drawing Sheets

POWER SWITCH FOR EXTERNAL MODULE ADAPTED TO INTERFACE WITH A PORTABLE INFORMATION HANDLING SYSTEM

FIELD OF THE INVENTION

This invention relates to portable information handling systems, and more particularly to a power switch for an external module adapted to interface with a portable information handling system.

BACKGROUND

Personal digital assistants (PDAs) allow busy people to perform a variety of tasks while away from a home or office computer. Many models of PDAs can be docked when the user is at his or her computer, allowing the user to recharge the PDA and/or to connect the PDA to the computer. Many PDAs include a slot for the insertion of external cards or modules, such as PCMCIA cards or proprietary modules. For example, the original schemes introduced the PCMCIA slot in notebooks and then moved on to add Cardbus for higher performance. Later, the Visor® brand PDA manufactured by Handspring, Inc. included a slot for accepting external Springboard® modules. Such external cards or modules can perform a variety of functions, such as providing additional memory or performing imaging functions. Typically, an external module is designed to activate when inserted into a PDA or similar information handling system.

Bigger notebook and laptop computers operate with power from batteries with substantial energy storage capacity. Present day PDAs, handhelds and some thinner laptops lack this luxury in their intended application environment. As these devices get faster, then their processors and associated circuitry will consume more of the internal power resources, thus increasingly limiting the power available for external modules. However, external modules for connection to those PDAs, handhelds and laptops increasingly provide greater functionality, at the price of increased power consumption. Thus, the internal power consumption of a portable information handling system, combined with the power consumption of an external module, can quickly drain the internal power supply of the portable information handling system, if enough power is even available to operate the external module in addition to the portable information handling system.

SUMMARY

A switch for an external module adapted for insertion into a portable information handling system switches on a module insertion detection signal when external power is applied. The switch can be located in either the portable information handling system or the external module. In this way, power provided to an external module with high power consumption is accommodated and controlled.

In one aspect of the invention, the application of external power to an external module connected to a portable information handling system switches on a card detection signal, thereby allowing the portable information handling system to detect and activate the external module. Automatic detection and activation of the external module simplifies the use of that external module and allows for easier operation of the portable information handling system in combination with the external module.

In another aspect of the invention, when external power is disconnected from the external module, the card detection signal is switched off, thereby deactivating the external module and electrically disconnecting the external module from the portable information handling system. In this way, the external module does not demand power when the portable information handling system is not connected to an external power source, conserving power within the portable information handling system and extending its operating time.

In another aspect of the invention, power is provided to an external module before it is logically connected to the portable information handling system. Once the external module is plugged in, it is recognized and configured, and becomes operational. A protocol allows for an orderly transition of context when an external module is inserted into the portable information handling system, so that it does not drain the internal power of the portable information handling system. Similarly, when the external module is disconnected the portable information handling system continues to function without any interruption.

In another aspect of the invention, substantially all of the power for the external module is provided independently from the internal power supply of the portable information handling system. In this way, the portable information handling system can use a power source at any voltage (e.g., 5V, 3.3V, 1.8V or other voltages) regardless of the voltage needs of the external module. Similar freedom is also accorded to the external module, which can be designed to run on any voltage. The portable information handling system handles exception events, such as external module insertion, without external power. Thus, only a small fraction of the power utilized by the external module is provided by the internal power supply of the portable information handling system (e.g., on the order of 2–5 mA).

The invention will be more fully understood upon consideration of the detailed description that follows, taken together with the accompanying drawings.

BRIEF DESCRIPTION OF THE DRAWINGS

Use of the same reference symbols in different figures indicates similar or identical items.

DETAILED DESCRIPTION

Figure 1:
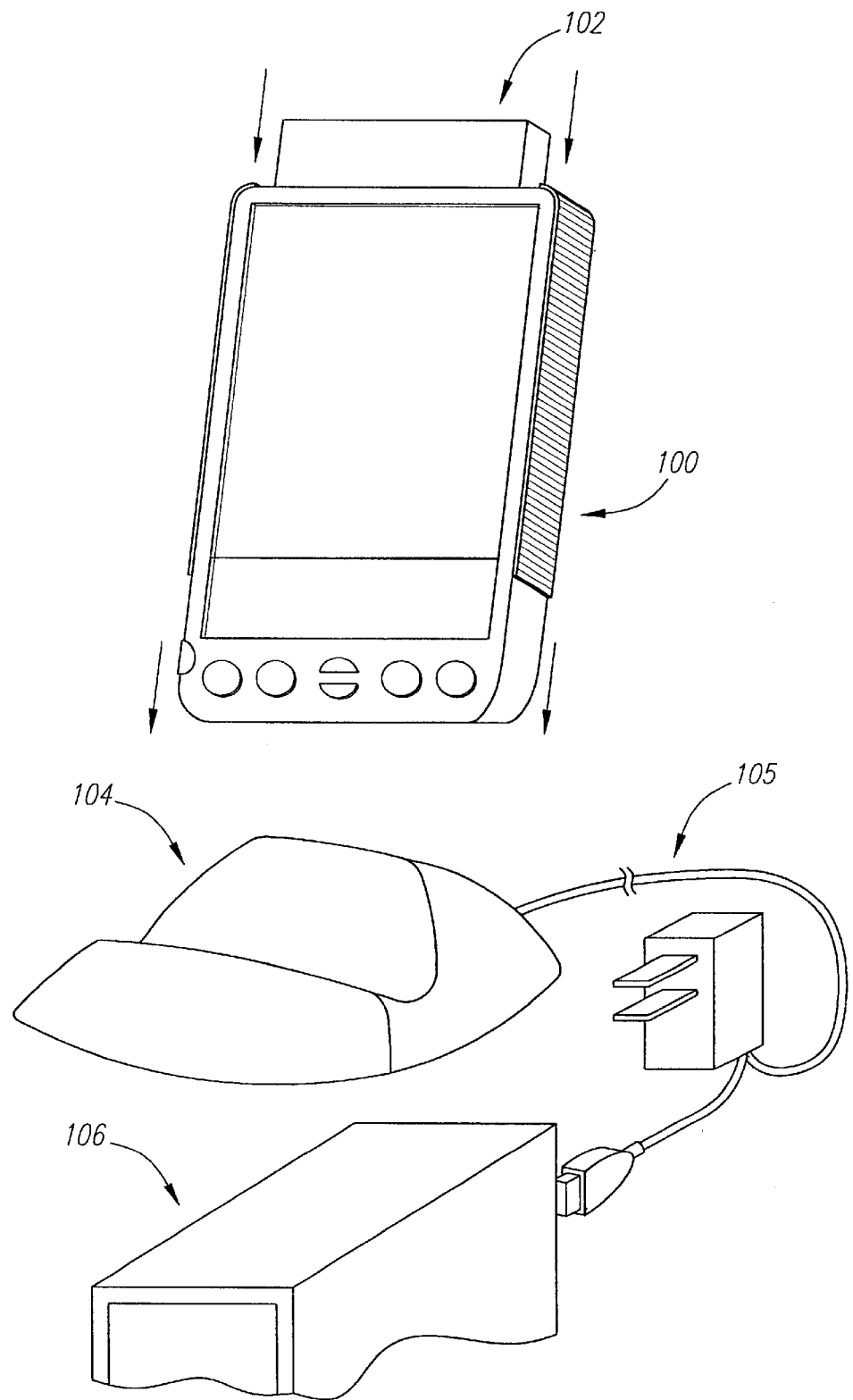
FIG. 1 is a perspective view of a PDA connected to a docking station.

Referring to FIG. 1, a portable information handling system 100 is shown. The portable information handling system 100 may be a PDA, such as a commercially available unit from Handspring, Palm, or Casio, a laptop, a handheld computer, or other device. For clarity, the portable information handling system 100 may be described in portions of this document as a PDA, but it will be recognized that any portable information handling system 100 may be used in place of a PDA.

The portable information handling system 100 includes a slot, port or other interface for accepting an external module 102. The external module may be a Springboard® module, PCMCIA card, compact flash card, Cardbus card or any other card or module adapted to connect to the portable information handling system 100 through a wired or wireless medium. The external module 102 preferably is adapted for detachable connection with the portable information handling system 100, such that different external modules 102 can be plugged into the portable information handling system 100 as desired by a user.

The portable information handling system 100 may be adapted to interface with a docking station 104. The docking station 104 provides for power transfer to the portable information handling system 100 and for data transfer between the portable information handling system 100 and the docking station 104. The docking station 104 preferably draws AC power from a standard wall socket, and transmits that power to the portable information handling system 100 as DC power. The transformation from AC to DC power may be performed with a standard AC adapter connected to a power cord 105 attached to the docking station 104, or with another device. The conversion of AC to DC power is standard in the art. The docking station 104 may additionally be connected to an information handling system such as a personal computer 106, or may additionally be connected to a communications network such as the Internet. The docking station 104 may be, for example, a HOTSYNC® brand cradle from Handspring.

Figure 2:
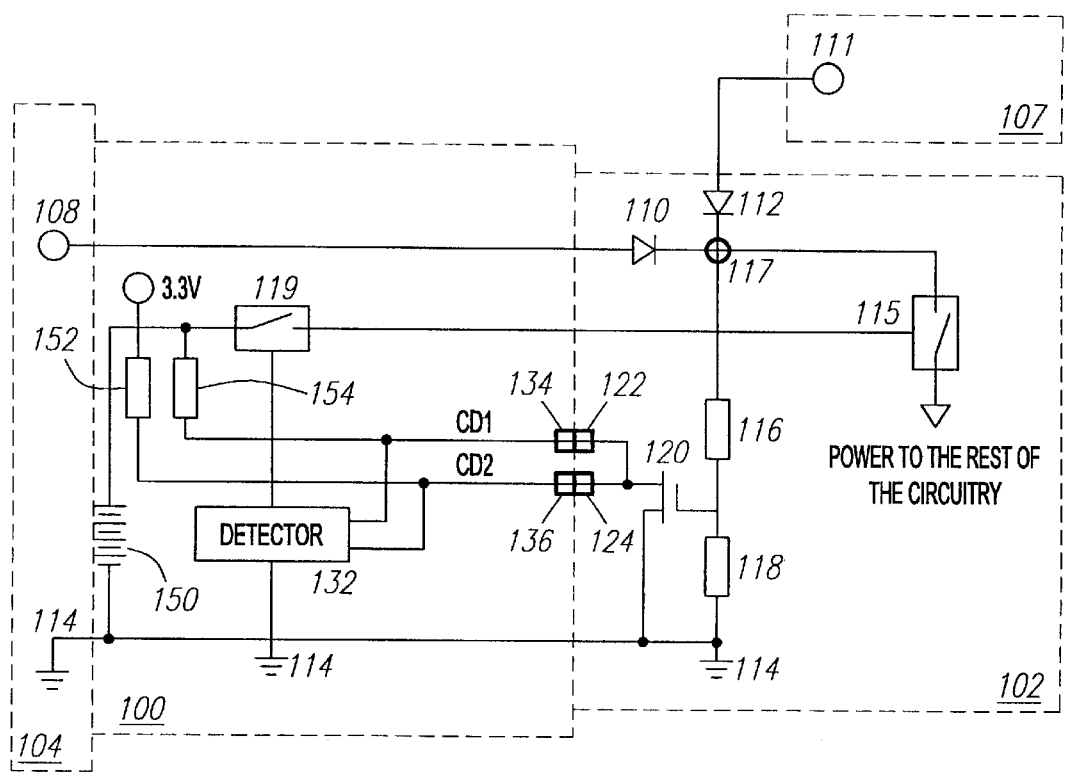
FIG. 2 is a schematic depiction of a PDA connected to a docking station, where the PDA is further connected to an external module.

Referring as well to FIG. 2, a schematic representation of one embodiment is shown. In FIG. 2, the portable information handling system 100 is shown connected to the docking station 104 and the external power supply 107 at the same time, for ease of description. However, the portable information handling system 100 need not be connected to both the docking station 104 and the external power supply 107 at the same time. In one embodiment, the docking station 104 provides power to the portable information handling system 100 through a connection to an external power source, such as the power cord 105. The external power source is terminated at a first power terminal 108 in the docking station 104. The external power source connected to the first power terminal 108 may instead be an uninterruptible power supply (UPS) or other device. The first power terminal 108 thus has a DC potential relative to ground. In one embodiment, the first power terminal 108 applies +5 volt DC power to the portable information handling system 100, which then transports it directly to the module 102. That is, power is transmitted from the first power terminal 108 to the module 102 such that the portable information handling system 100 uses substantially none of that power. Other voltages than +5 VDC may be used if desired. In another embodiment, power transmitted from the docking station 104 into the portable information handling system 100 may also be utilized for other purposes within the portable information handling system 100, such as recharging an internal power supply 150 within the portable information handling system 100 such as a battery, or for operating a microprocessor (not shown) or other circuitry within the portable information handling system 100. For clarity, most of the circuitry and structures within the portable information handling system 100 associated with such uses of power have been omitted from FIG. 2. In one embodiment, the control voltage within the portable information handling system 100 is 3.3 VDC, which is commonly used for PDAs. In another embodiment, the control voltage within the portable information handling system 100 is 5 VDC, which is commonly used for laptop computers.

In another embodiment, power is transmitted to the module 102 from an external power supply 107 connected to the module 102, instead of or in addition to the docking station 104. Such an external power supply 107 may be desirable, for example, for connection to a module 102 that utilizes a large amount of power. The power from the external power supply 107 is terminated at a second power terminal 111. The external power supply 107 may be DC power converted from AC power obtained through a wall socket as described above, a battery within the external power supply 107, or another power source. The external power supply 107 may be, for example, an External Power Brick commercially available from Margi Systems.

In one embodiment, the module 102 has two steering diodes 110, 112 for power distribution. The steering diodes 110, 112 enable the connection of different power sources to the module 102. Power from the docking station 104 is brought in through the first steering diode 110. Power from the external module 107 is brought in through the second steering diode 112. The outputs of the diodes 110, 112 are tied together to provide a common power terminal 117 for the module. Typically, the first power terminal 108 applies +5 volt DC power to the first diode 110, and/or the second power terminal 111 applies +6 volt DC power to the second diode 112. However, other voltages may be used if desired, because that the two diodes 110, 112 keep the two power sources 108, 111 isolated and safe. In one embodiment, the two diodes 110, 112 are Schottky diodes, which may be encapsulated in SOT-23 packages. Schottky diodes are commonly used in power supplies due to their high current density and low forward voltage drop. However, different types of diodes and packages may be used, if the voltage drops and physical sizes are suitable.

Referring back to the portable information handling system 100, a detector/controller 132 is included in the portable information handling system 100. The detector/controller 132 may be any controller compatible with the module 102, such as a PCMCIA controller, a CardBus controller or the Handspring version (Springboard®) of the same, all of which are standard and commercially available. Preferably, the controller 132 includes, or is electrically connected to, a first pin 134 and a second pin 136, shown as blocks on FIG. 2. In one embodiment, the first pin 134 and the second pin 136 are two pins of a connector constructed according to PCMCIA or Springboard® standards to electrically connect to the module 102. The first pin 134 is adapted to connect with a first socket 122 on the module 102, and the second pin 136 is adapted to connect with a second socket 124 on the module 102. The sockets 122, 124 on the module 102 are also shown as blocks, for clarity. In one embodiment, the first socket 122 and the second socket 124 are two sockets of a larger connector constructed according to the PCMCIA or the Springboard® standards. The first socket 122 and the second socket 124 are connected to the source terminal of a first transistor 120 within the module 102, which is described in greater detail below. While the pins 134, 136 and the sockets 122, 124 have been described in terms of the PCMCIA or the Springboard® standards and in terms of specific pin and socket structure, other structures and connector configurations may be used if desired.

The first pin 134 carries to the first socket 122 a first card detect signal that may be referred to as "card detect 1" or "CD1". The second pin 136 carries to the second socket 124 a second card detect signal that may be referred to as "card detect 2" or "CD2." The CD1 and CD2 signals are standard in protocols such as PCMCIA or the Springboard® standards. The CD1 and CD2 signals originate in, or under the control of, the detector/controller 132. In one embodiment, the CD1 and CD2 signals originate via signal resistor 152, 154 electrically connected to the internal power supply 150 of the portable information handling system 100, which supplies voltage equivalent to a logic high. The resistances of the signal resistors 152, 154 are chosen to provide CD1, CD2 signals of appropriate current. In one embodiment, the CD1 and CD2 signals (in the present Springboard standards, or one as well as both of them as in the PCMCIA standards) are asserted low by electrically shorting to ground, and are not asserted otherwise. That is, until the first pin 134 and the second pin 136 are shorted to ground to have CD1 and CD2 signals asserted low, each pin 134, 136 is part of an open circuit and is said to be de-asserted. In another embodiment, the second pin 136 and the second socket 124 may be omitted, and single card detect signal may be used. In another embodiment, one or more additional pins and sockets, and a corresponding additional number of card detect signals, may be provided, where each additional card detect signal is also applied to the source terminal of the first transistor 120.

In one embodiment, the pins 134, 136 carrying the CD1 and CD2 signals are shorted when (a) the module 102 is inserted into the portable information handling system 100 and (b) external power is applied to the common power terminal 117 of the module 102. The sockets 122, 124 carrying the CD1 and CD2 signals are tied together and connected to the source of a field effect transistor 120 rather than the ground. Controlling the first transistor 120 on or off shorts or opens respectively the connection between the sockets 122, 124 and ground 114. Thus, the card detect signals CD1, CD2 are controlled by the first transistor 120.

The external power provided to the module 102 at the common power terminal 117 is applied to a first resistor 116 within the module 102. The first resistor 116 is connected to the gate terminal of the first transistor 120. In one embodiment, the first transistor 120 is an N-type field-effect transistor, but other types of transistor may be used if desired and the circuit configured accordingly. The use of the N-type field-effect transistor gives the lowest component count for the application. Further, while the first transistor 120 is described as having the gate, source and drain terminals of a field-effect transistor, one skilled in the art will recognize that if a bipolar transistor is used instead, that bipolar transistor will have analogous base, collector and emitter terminals, and will operate in a similar manner as described below.

The first resistor 116 is connected to the gate terminal of the first transistor 120. A second resistor 118 also is connected to the gate terminal of the first transistor 120, between that gate terminal and a ground 114. Preferably, the first resistor 116 and the second resistor 118 have substantially equivalent resistance and act as a voltage divider, such that the voltage at the gate terminal of the first transistor 120 is substantially half of the voltage applied to the module 102. In another embodiment of the invention the resistance of the each resistor 116, 118 can be any value, such that the voltage at the junction of the resistors 116, 118, upon application of external power to the common power terminal 117 is sufficient to turn on the gate. That is, the voltage at the gate terminal upon application of external power to the common power terminal 117 is determined by the ratio of resistors 116 and 118, such that the voltage applied to the gate terminal is adequate to turn on the first transistor 120. In other words, the voltage at the gate terminal upon application of external power to the common power terminal 117 is greater than the switching voltage of the first transistor 120. Calculation of the appropriate resistance of the resistors 116, 118 is a simple application of rudimentary circuit theory. Further, because in one embodiment the transistor 120 is a field effect transistor, the absolute value of the resistors can be high (in the order of hundreds of ohms or higher) reducing the operating current requirement to a very small amount. Thus, the first transistor 120 acts as a switch.

The source terminal of the first transistor 120 is connected to both the first socket 122 and the second socket 124. Thus, one of or both of the signals CD1 and CD2 may be applied to the source terminal of the first transistor 120 via the first socket 122 and/or the second socket 124. The drain terminal of the first transistor 120 is connected to ground 114.

Figure 3:
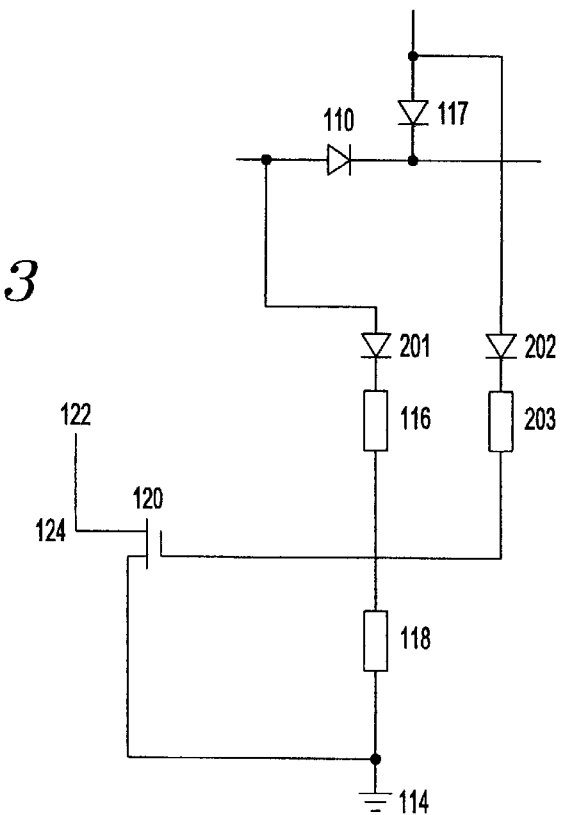
FIG. 3 is a schematic depiction of yet another variation of the power distribution scheme employed in FIG. 2.

Referring to FIG. 3, in another embodiment two diodes 201, 202 and a resistor 203 can be used in addition to the first resistor 116 and the second resistor 118. The input of the first diode 201 is connected to the first power terminal 108 upstream of the first steering diode 110, and the output of the first diode 201 is connected to one terminal of the first resistor 116. The input of the second diode 202 is connected to the second power terminal 111 upstream of the second steering diode 117, and the output of the second diode is connected to one terminal of the third resistor 203. The opposite terminals of the first resistor 116 and the third resistor 203 are connected to the gate terminal of the terminal 120. This configuration can accommodate large voltage differences between the voltage provided from the docking station 104 and the voltage provided from the external power source 107.

For clarity, further description of the module 102 and the portable information handling system 100 is provided through an example of their operation. Referring back to FIGS. 1–2, a user inserts the module 102 into an appropriate interface in the portable information handling system 100. Unlike the usual circuits in external modules for a Springboard® or PCMCIA slot, the CD1 and CD2 signals are not asserted, because the transistor 120 is placed in the path to ground 114, and no voltage is applied to its gate terminal. The module 102 remains unrecognized by the portable information handling system 100 upon insertion into the appropriate interface in the portable information handling system 100.

In order for the portable information handling system 100 to recognize the module 102, external power is applied to the common power terminal 117 of the module 102, either from the docking station 104 or the external power supply 107. As a result, voltage is applied to the gate of the first transistor 120. As described above, in one embodiment, the first resistor 116 and the second resistor 118 have substantially the same resistance. Thus, the voltage at the gate terminal of the first transistor 120 is substantially half of the voltage applied to the module 102. Thus, if external power is supplied through the docking station 104 at 5 volts, substantially 2.5 volts is applied to the gate terminal of the first transistor 120. Similarly, if external power is supplied through the external power supply 107 at 6 volts, substantially 3 volts is applied to the gate terminal of the first transistor 120.

The first transistor 120 preferably has a switching voltage of 2 volts. That is, the first transistor 120 is off (i.e., has a high impedance between its source and its drain) when the gate voltage is less than two volts, and is on (i.e., will pass a current between its source and its drain) when the gate voltage is greater than two volts. Thus, whether the docking station 104 or the external power supply 107 is used to power the module 102, enough voltage is applied from either source to the gate terminal to switch on the first transistor 120. If a different voltage is to be applied to the module 102, then the switching voltage of the first transistor 120 is selected such that it is less than half of the voltage applied to the module 102. Further, the first resistor 116 and the second resistor 118 may be chosen to have different values, in order to change the fraction of the external voltage supplied to the module 102 that is applied to the gate terminal of the first transistor 120. Thus, the first resistor 116 and the second resistor 118 deliver the proper voltage to the gate terminal of the first transistor 120 to turn on the first transistor 120 and allow current to flow from the drain to the source and thus to ground 114, thereby effectively grounding the CD1 and CD2.

In the portable information handling system 100, the detector/controller 132 recognizes that the signals CD1 and CD2 have been asserted low and shorted to ground. The assertion of the CD1 and CD2 signals is a change from the prior state of the connections of the first pin 134 and the second pin 136 of the portable information handling system 100. This change of state causes the controller 132 to recognize and activate the module 102 in a standard manner. As an example, the recognition by the controller 132 that the CD1 and CD2 signals have been asserted generates an interrupt that is passed to a processor (not shown) within the portable information handling system 100. The processor, in turn, switches on the standard supply of 3.3V or 5V, provided by the internal power supply 150 of the portable information handling system 100, and applies that power to a power enable switch 119 in the portable information handling system 100. The power enable switch 119 is directed to close by the detector/controller 132 upon detection that the CD1 and CD2 signals have been asserted. Thus, power is applied through the power enable switch 119 to a control terminal on a module power switch 115 in the module 102. The module power switch 115 may be a field effect transistor, one or more enable pins of a voltage regulator or regulators (not shown) in the module 102, or another form of switch circuitry. This application of power closes the module power switch 115, allowing external power to flow from the common power terminal 117 through the module power switch 115 to the rest of the circuitry in the module 102. In this way, the module 102 is both recognized by the portable information handling system 100 and powered up with external power.

The use of the switches 119, 115 and the steering diodes 110, 111 enable the use of different voltage values from the various external power sources. For example, the working voltage of the portable information handling system 100 may be 3.3V, and the working voltage of the PCMCIA, Springboard® or other socket may be 3.3V or 5 V. The usual voltage from the docking station 104 may be between 5 to 7V. The usual voltage from the external power supply 107 may be between 9 to 12V. In this example, standard voltage regulators inside the module 102 can convert the voltage received from the docking station 104 or the external power supply 107 to a desired operating voltage once the module 102 has been switched on.

External power can be disconnected from the module 102, when desired. This happens when the portable information handling system 100 is removed from the docking station 104, when the external power supply 107 is disconnected from the module 102, or both, if the portable information handling system 100 had been connected to both the docking station 104 and the external power supply 107. Upon disconnection of external power, voltage is no longer applied to the gate terminal of the first transistor 120. As a result, the first transistor 120 switches off, and CD1 and CD2 are no longer shorted together to ground 134. That is, CD1 and CD2 are no longer asserted through the first socket 122 and the second socket 124. The cessation of asserting the CD1 and CD2 signals is a change from the prior state of the connections of the first pin 134 and the second pin 136 of the portable information handling system 100. This change of state causes the detector/controller 132 to deactivate the module 102 in a standard manner. As an example, the recognition by the controller 132 that the CD1 and CD2 signals have ceased being asserted generates an interrupt that is passed to a processor (not shown) in the portable information handling system 100, in turn powering down the power enable switch 119 in the PDA, in turn turning off the module power switch 115, which deactivates the rest of the module 102 in a standard manner.

Power from the internal power supply 150 of the portable information handling system 100 is used to switch on the module power switch 115. This power is insignificant compared to the total power required by the module 102 for its functionality. That is, the total power requirement of the module 102 for its operation is supplied by the external sources 104 or 107. In effect, the use of the switching circuits in the module 102 prevents draining of the batteries in the portable information handling system 100. Thus, full use of the module has negligible impact on the energy status of the battery in the portable information handling system 100. Considering that the module 102 is switched off when the externally supply is removed, there is no energy drain from the PDA battery even if there is an inadvertent removal of power and the portable information handling system 100 does a logical de-insertion of the module 102, even though it is still connected.

Figure 4:
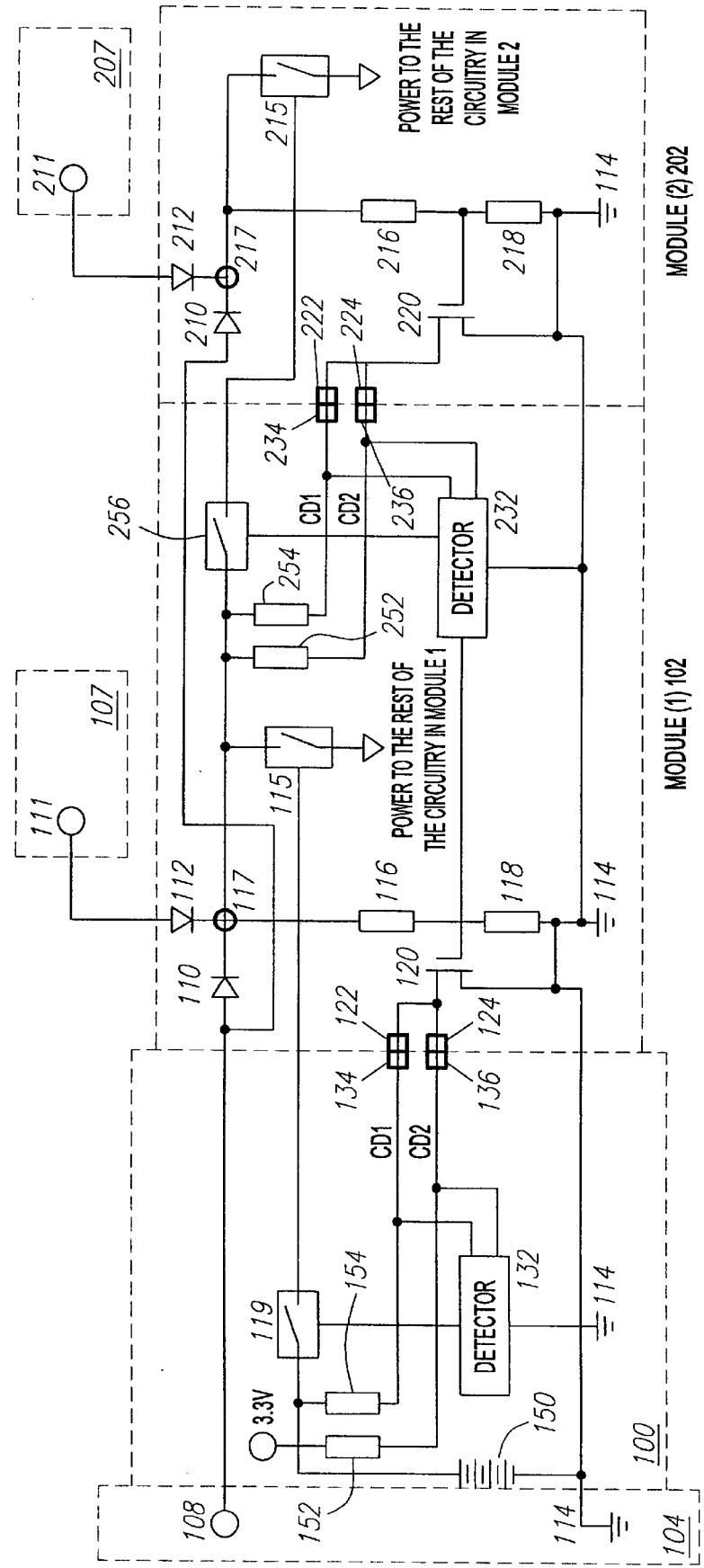
FIG. 4 is a schematic depiction of a PDA connected to a docking station and an external module, where the external module is further connected to a detachable card.

Referring to FIG. 4, in another embodiment, a first module 102 is adapted to receive or otherwise interface with a second module 202. Physically, the first module 102 may have a header connector and the second module 202 may have a receptacle connector, similar to the interface between the portable information handling system 100 and the first module 102 as described above. The second module 202 connects operationally to the first module 102 in the same manner as the first module 102 connects to the portable information handling system 100, as described above. For clarity, only the differences between the embodiment of FIG. 4 and the embodiment described above will be described in detail. To easily recognize similar components used in different devices, numbering of the components is set as 1XX for the first component and the series 2XX for the second component as listed below:

PDA detector/controller is 132, first module detector/controller is 232.
PDA CD1 pin is 134, first module CD1 pin is 234.
PDA CD2 pin is 136, first module CD2 pin is 236.
PDA power enable switch is 119, first module power enable switch is 219.
First module CD1 socket is 122, second module CD1 socket is 222.
First module CD2 socket is 124, second module CD1 socket is 224
First module docking voltage diode is 110, second module docking voltage diode is 210.
First module external voltage diode is 112, second module external voltage diode is 212.
First module transistor is 120, second module transistor is 220.
First module hi-side bias resistor is 116, second module hi-side bias resistor is 216.
First module lo-side bias resistor is 118, second module lo-side bias resistor is 218.

First module power switch is 115, second module power switch is 215.

First module external power supply is 107, second module external power supply is 207.

First module external power terminal is 111, second module external power terminal is 211.

Though the functional similarities can be deduced, to avoid ambiguity, the following paragraphs provide detailed explanation.

Preferably, the first module 102 includes a module detector/controller 232. The module detector/controller 232 can be an FPGA, an ASIC, or other device, the logic of which detects the insertion and removal of the second module 202 from the first module 102. The module detector/controller 232 may be a stripped-down version of the detector/controller 132 in the portable information handling system 100, as its logic is similar to the detector section of the standard detector/controller 132 in the portable information handling system 100. The first module 102 preferably includes a first card pin 234 and a second card pin 236. The first card pin 234 and the second card pin 236 are electrically connected to the detector 232. In one embodiment, the first card pin 234 and the second card pin 236 are two pins of a larger connector constructed according to the PCMCIA or the Springboard® standards. The first card pin 234 is adapted to carry a CD1 signal from the module detector/controller 232, and the second card pin 236 is adapted to carry a CD2 signal. from the module detector/controller 232. The CD1 and CD2 signals generated by the first module detector/controller 232 are as described above with regard to the controller 132 of the portable information handling system 100, and perform the same functions. The module detector/controller 232 is also electrically connected to the first terminal of the second transistor 220.

The first card pin 234 is adapted to connect with a first card socket 222 on the second module 202, and the second pin 236 is adapted to connect with a second card socket 224 on the second module 202. In one embodiment, the first card socket 222 and the second card socket 224 are two sockets of a larger connector constructed according to the PCMCIA or Springboard® standards. While the pins 234, 236 and the sockets 222, 224 have been described in terms of the PCMCIA or Springboard® and other similar standards and in terms of specific pin and socket structure, other structures and connector configurations may be used if desired. For example, pins may be placed on the second module 202 corresponding with sockets on the first module 102.

In the embodiment of FIG. 4, the first module 102 is adapted to connect electrically to one or more second modules 202. Preferably, power is provided to the second module 202 through the first module 102. This power may be used by the second module 202 to perform a variety of functions, depending on the structure of the second module 202 and its intended purpose. In one embodiment, the second module 202 is powered by its own external power supply 207 with the second power terminal 211. In this way, the first module 102 can work with a different voltage as compared to the second module 202. In addition, the second module 202 can be inserted into the first module 102 but remain inoperative until it is independently powered up. Further, the first module 102 and the second module 202 may utilize different power levels. In this way, connected modules 102, 202 can each utilize different voltage and power levels for operation, if desired.

The second module 202 includes a second transistor 220, the structure of which is as described above with regard to the first transistor 120. The second transistor 220 is preferably an N-type field-effect transistor, but other types of transistor may be used if desired. As with the first transistor 120, the second transistor 220 is described in this document as a field-effect transistor having gate, source and drain terminals, but one skilled in the art will recognize that if a bipolar transistor is used, the analogous base, collector and emitter terminals are connected in the same manner as described below. A third resistor 216 is connected to the gate terminal of the second transistor 220. A fourth resistor 218 is also connected to the gate terminal of the second transistor 220, between that gate terminal and a ground 114, and in series with the third resistor 216 to form a voltage divider, in the same manner as described above with regard to the first module.

The source terminal of the second transistor 220 is connected to both the first card socket 222 and the second card socket 224. Thus, one or both of the signals CD1 and CD2 from the detector 232 may be applied to the source terminal of the second transistor 220 via the first card socket 222 and the second card socket 224. The CD1 and CD2 signals originate in, or under the control of, the module detector/controller 232. In one embodiment, the CD1 and CD2 signals originate via signal resistors 252, 254 electrically connected to the common power terminal 117 of the module 102, which supplies voltage equivalent to a logic high. The resistance of the signal resistors 152, 154 are chosen to provide CD1, CD2 signals of appropriate current. The drain terminal of the second transistor 220 is electrically connected to ground 114.

The module 202 is not limited to a particular device, and may be, for example, a PCMCIA card, Springboard® module or a flash memory card. With minor modifications within the knowledge of one skilled in the art, the interface between the modules 102, 202 can be made between CardBus devices or SD (Secure Digital) Memory Card devices.

A user inserts the second module 202 into an appropriate interface in the first module 102 to electrically connect the second module 202 to the first module 102, or in another manner electrically connects the second module 202 to the first module 102. The first module 102 is already connected to the portable information handling system 100, and has already been recognized and activated by the portable information handling system 100. The second module 202 is initially unrecognized by the first module 102 or the portable information handling system 100. When the second module 202 is connected to the module 102, and power is applied to a second common power terminal 217, a portion of the power applied to the second module 202 is applied to the third resistor 216. The ratio between the values of the resistors 216, 218 depends on the supply voltage and the switching voltage of the field effect transistor 220, as described above with regard to the resistors 116, 118 in the module 102. The resistors 216, 218 are selected such that the application of appropriate external power to the common power terminal results in a voltage at the gate terminal of the second transistor 220 adequate to turn on the second transistor 220.

When the second transistor 220 is switched on, the signals CD1 and CD2 from the module detector/controller 232 that are applied to the source terminal of the second transistor 220 are shorted to ground 114. In the same manner as described above with regard to the first module 102, the module detector 232 recognizes that the signals CD1 and CD2 have been asserted low and shorted to ground. The assertion of the CD1 and CD2 signals is a change from the prior state of the connections of the first card pin 234 and the second card pin 236 of the module 102, and causes the module detector 232 to power up the circuitry in the second module 202 and initiate an interrupt to the portable information handling system 100. That is, a second power enable switch 256 is directed to close by the module detector/controller 232 upon detection that the CD1 and CD2 signals have been asserted. Thus, power is applied through the second power enable switch 256 to a control terminal on a second module power switch 215 in the second module 202. The second module power switch 215 may be a field effect transistor, one or more enable pins of a voltage regulator or regulators (not shown) in the second module 202, or another form of switch circuitry. This application of power closes the second module power switch 215, allowing external power to flow from the common power terminal 217 through the second module power switch 215 to the rest of the circuitry in the second module 202. In this way, the second module 102 is recognized, and powered up with external power.

As an example, the recognition by the module detector 232 that the CD1 and CD2 signals have been asserted generates an interrupt that is passed to a processor (not shown) in the portable information handling system 100. This signals the software in system to reconfigure the modules as indicated by the information in the modules or as prearranged in the system. At the end of the configuration the two modules functionally behave as a single unit connected to the PDA.

When the card 202 is removed from the module 102, voltage is no longer applied to the gate terminal of the second transistor 222. As a result, the second transistor 222 switches off, and the signals CD1 and CD2 are no longer shorted together to ground 114. That is, CD1 and CD2 are no longer asserted from the module detector 232 through the first card pin 234 and the second card pin 236. The cessation of asserting the CD1 and CD2 signals is a change from the prior state of the connections of the first card pin 234 and the second card pin 236 of the second module 202. This change causes the module detector/controller 232 to deactivate the card 202 in a standard manner.

As described above with regard to the portable information handling system 100, an interrupt maybe generated that triggers the deactivation of the second module 202. The module detector 232 may additionally reset the first module 102, if desired. Because the portable information handling system 100 no longer recognizes that a second module 202 is present in the first module 102, no power is supplied from the portable information handling system 100 to the card 202 via the module 102 after the external power source has been disconnected, thereby protecting any internal power source within the portable information handling system 100 from depletion. That is, the portable information handling system 100 and the module 102 act as if the card 202 has been disconnected physically and electrically, although the card 202 is may still be attached to the module 102.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A power switch for an electronic component adapted to receive power from at least one external source and at least one card detect signal from an external source, comprising a transistor comprising a first terminal, a second terminal and a third terminal, wherein said first terminal is adapted to receive applied voltage from at least one external source, said second terminal is adapted to receive the at least one card detect signal from the external source, and said third terminal is connectable to ground, whereby application of voltage to said first terminal shorts the card detect signal to ground.

2. The power switch of claim 1, further comprising:
   a first resistor between said first terminal and the at least one external power source; and
   a second resistor between said first terminal and ground.

3. The power switch of claim 2, wherein said transistor has a switching voltage, and wherein said first resistor and said second resistor form a voltage divider such that the voltage delivered to said first terminal of said transistor from the at least one external power source is at least equal to said switching voltage.

4. The power switch of claim 1, wherein said transistor is an N-type field effect transistor, said first terminal is a gate terminal, said second terminal is a source terminal, and said third terminal is a drain terminal.

5. The power switch of claim 1, wherein said transistor is an N-type bipolar transistor, said first terminal is a base terminal, said second terminal is an emitter terminal, and said third terminal is a collector terminal.

6. The power switch of claim 1, wherein said second terminal of said resistor is adapted to receive two card detect signals from the external source.

7. The power switch of claim 1, wherein the electronic component is a card connectable to a module, said module in turn connectable to an information handling system.

8. A module adapted to interface with at least one external power source and with a portable information handling system providing at least one card detect signal, comprising:
   a transistor comprising a first terminal, a second terminal and a third terminal, wherein said first terminal is adapted to receive applied voltage from the at least one external power source, said second terminal is adapted to receive the at least one card detect signal from the portable information handling system, and said third terminal is connectable to ground;
   a common power terminal connected to said first terminal of said transistor; and
   a steering diode comprising an input electrically connected to the at least one external power source and an output electrically connected to said common power terminal, whereby application of voltage to said first terminal via said steering diode shorts the card detect signal to ground.

9. The module of claim 8, further comprising a second steering diode comprising an input electrically connected to a different at least one external power source and an output electrically connected to said common power terminal.

10. The module of claim 9, wherein each external power source connected to said common power terminal has a different voltage level, and wherein the module further comprises a voltage regulator electrically connected to said common power terminal, said voltage regulator adapted to convert said voltage level at said common power terminal to a different voltage.

11. The module of claim 8, further comprising:
   a first resistor between said first terminal and said common power terminal; and
   a second resistor between said first terminal and ground;
   wherein said transistor has a switching voltage, and wherein said first resistor and said second resistor form a voltage divider such that the voltage delivered to said first terminal of said transistor from the at least one external power source is at least equal to said switching voltage.

12. The module of claim 8, further comprising a module power switch electrically connected to the portable information handling system, wherein said portable information handling system closes said module power switch upon application of external power to said common power terminal.

13. The module of claim 8, further comprising a connector comprising at least one socket electrically connected to said second terminal of said transistor, wherein the at least one card detect signal is received through said at least one socket.

14. A power switching system connectible to an external power source, comprising:
- a portable information handling system comprising at least one contact adapted to carry a card detect signal; and
- a first module detachably connected to said portable information handling system, said first module comprising
    - a transistor comprising a first terminal, a second terminal and a third terminal, wherein said first terminal is adapted to receive applied voltage from the at least one external power source, said second terminal is adapted to receive the at least one card detect signal from the portable information handling system, and said third terminal is connectable to ground, wherein said transistor has a switching voltage;
    - at least one contact electrically connected to said second terminal of said transistor, said at least one contact adapted to interface with said at least one contact of said portable information handling system;
    - a first resistor between said first terminal and the at least one external power source; and
    - a second resistor between said first terminal and ground, such that voltage delivered to said first terminal of said transistor from the at least one external power source is at least equal to said switching voltage.

15. The system of claim 14, wherein said portable information handling system further comprises a detector/controller electrically connected to said at least one contact on said portable information handling system, said detector/controller adapted to monitor the card detect signal.

16. The system of claim 15, wherein said portable information handling system further comprises:
- an internal power source; and
- a power enable switch electrically connected to said internal power source and to said detector/controller, wherein said detector/controller closes said power enable switch when the card detect signal is shorted to ground, such that power from said internal power source is transmitted to said module.

17. The system of claim 14, wherein said at least one contact on said portable information handling system is a pin, and said at least one contact electrically connected to said second terminal of said transistor is a socket.

18. The system of claim 14, further comprising a second module adapted to interface with at least one external power source and with said first module, said first module providing at least one card detect signal from said portable information handling system to said second module, said second module comprising:
- a second transistor comprising a first terminal, a second terminal and a third terminal, wherein said first terminal is adapted to receive applied voltage from the at least one external power source, said second terminal is adapted to receive the at least one card detect signal from the portable information handling system, and said third terminal is connectable to ground;
- a second common power terminal connected to said first terminal of said second transistor; and
- a second steering diode comprising an input electrically connected to the at least one external power source and an output electrically connected to said second common power terminal, whereby application of voltage to said first terminal via said steering diode shorts the card detect signal to ground.

19. The system of claim 18, wherein said first module further comprises a module detector/controller electrically connected to at least one contact on said first module, said module detector/controller adapted to monitor the card detect signal.

20. The system of claim 18, wherein said first module further comprises a second power enable switch electrically connected to said internal power source of said portable information handling system and to said module detector/controller, wherein said module detector/controller closes said second power enable switch when the card detect signal is shorted to ground, such that power from said internal power source is transmitted to said second module.

21. The system of claim 20, wherein said second module further comprises a second module power switch electrically connected to said first module, wherein said module detector/controller of said first module closes said second module power switch upon application of external power to said second common power terminal.

22. A method for switching power provided to a module having a transistor comprising a first terminal, a second terminal and a third terminal, the first terminal adapted to receive applied voltage from at least one external source and the third terminal connected to ground, the transistor having a switching voltage, the module adapted to connect to a portable information handling system, the method comprising:
- connecting the module to the portable information handling system;
- applying a card detect signal to the second terminal of the transistor;
- applying external power to the first terminal of the transistor, the external power having a voltage at least equal to the switching voltage of the transistor;
- switching on the transistor in response to said applying external power, such that said card detect signal is shorted to ground;
- detecting in the portable information handling system that said card detect signal is shorted to ground; and
- activating the module.

23. The method of claim 22, further comprising:
- ceasing application of external power to the first terminal of the transistor;
- switching off the transistor in response to said ceasing, such that said card detect signal is no longer shorted to ground;
- detecting in the portable information handling system that said card detect signal is no longer shorted to ground; and
- deactivating the module.

* * * * *

UNITED STATES PATENT AND TRADEMARK OFFICE
CERTIFICATE OF CORRECTION

PATENT NO. : 6,696,771 B2
DATED : February 24, 2004
INVENTOR(S) : Acharya et al.

It is certified that error appears in the above-identified patent and that said Letters Patent is hereby corrected as shown below:

<u>Title page,</u>
Item [*] Notice, delete "375 days" replace with -- 428 days --.

Signed and Sealed this

Twenty-second Day of November, 2005

JON W. DUDAS
*Director of the United States Patent and Trademark Office*